(12) United States Patent
Vlahos (10) Patent No.: US 6,454,415 B1
(45) Date of Patent: Sep. 24, 2002

(54) INTERACTIVE TELECONFERENCING DISPLAY SYSTEM

(75) Inventor: Paul Vlahos, Tarzana, CA (US)

(73) Assignee: imatte, Inc., Chatsworth, CA (US)

( * ) Notice: Subject to any disclaimer, the term of this patent is extended or adjusted under 35 U.S.C. 154(b) by 0 days.

(21) Appl. No.: 10/038,229

(22) Filed: Jan. 2, 2002

Related U.S. Application Data

(63) Continuation-in-part of application No. 09/788,026, filed on Feb. 16, 2001, now Pat. No. 6,361,173.

(51) Int. Cl.[7] ............................ G03B 21/00; H04N 9/74
(52) U.S. Cl. ...................... 353/30; 353/121; 348/586; 348/590; 348/14.1
(58) Field of Search ............................... 353/122, 28, 97, 353/30, 121; 348/586, 590, 607, 14.1, 588, 584

(56) References Cited

U.S. PATENT DOCUMENTS

| | | | |
|---|---|---|---|
| 5,574,511 A | * 11/1996 | Yang et al. | 348/586 |
| 5,751,337 A | 5/1998 | Allen et al. | |
| 5,912,700 A | * 6/1999 | Honey et al. | 348/157 |
| 5,923,380 A | * 7/1999 | Yang et al. | 348/586 |
| 5,971,544 A | * 10/1999 | Perry | 353/28 |
| 6,160,573 A | 12/2000 | Allen et al. | |
| 6,198,503 B1 | * 3/2001 | Weinreich | 348/164 |
| 6,252,632 B1 | * 6/2001 | Cavallaro | 348/585 |
| 6,259,470 B1 | * 7/2001 | Koizumi et al. | 348/14.1 |

* cited by examiner

Primary Examiner—William Dowling
(74) Attorney, Agent, or Firm—Blakely Sokoloff Taylor & Zafman (57) ABSTRACT

A teleconferencing system in which the video image of a subject in front of a selected background scene is extracted from that scene and transmitted to other locations where selected backgrounds are stored. By compositing the subject and background images at each remote location, both image elements, being originals, will show no loss of detail when projected. For a front projection screen, the projector is inhibited from illuminating a presenter.

18 Claims, 5 Drawing Sheets

INTERACTIVE TELECONFERENCING DISPLAY SYSTEM

Related Applications

This is a continuation-in-part of U.S. application Ser. No. 09/788,026 filed Feb. 16, 2001.

BACKGROUND OF THE INVENTION

Teleconferencing, the use of video and sound to connect two or more locations, permits groups of people at a distant location to see and hear a presenter at another location. A presenter from a remote location will typically be combined with graphics using a split screen technique or dual monitors.

Rear projection, and large liquid crystal display screens, have been used to combine the presenter with graphics. The audience in the same room with the presenter, in front of the rear projection or liquid crystal display, is seeing first generation graphics, but when photographed and transmitted to another location, it must be projected again which makes it second generation. Because of the loss of two generations, the graphic data at the distant location is degraded to a point where many graphs, charts and text cannot be clearly read.

Combining the presenter with the graphics using front projection suffers from the additional problems of blinding the presenter, and distorting the graphics his body intercepts, which is disconcerting to the viewers.

In teleconferencing, there are numerous variations in the techniques for combining a presenter and the selected graphics. None of these techniques can be considered ideal. The effort to place the presenter in front of the projected graphics is to improve personal contact between a presenter and his audience, as compared to the sleep inducing graphics image with an off-screen presenter.

BRIEF DESCRIPTION OF THE INVENTION

The Interactive Teleconferencing Display System uses equipment performing identical functions at each location thus permitting any location to originate or participate in a conference. The equipment includes a front or rear projection screen, an electronic projector, and a signal processor. When the presenter is in front of a front projection screen, a matte signal is generated that selectively inhibits the projector to prevent the projected graphics from illuminating the presenter. The graphics are downloaded and stored at all locations. The presenter, having been extracted by a matte signal is transmitted to all locations where it is matted over the graphics before projection. By separately transmitting the graphics image and the presenter's image, and combining them at the remote location, each is an original and there is no loss of detail when displayed.

An individual at another location may participate at any time by stepping in front of his screen. All locations will see and hear both the presenter and the additional participant. Both participants may look at each other, point to, and discuss the material being displayed. They may also look toward their local audience without being blinded by the projector. Participants from other locations may join in and also appear on all screens.

DETAILED DESCRIPTION OF THE INVENTION

Figure 1:
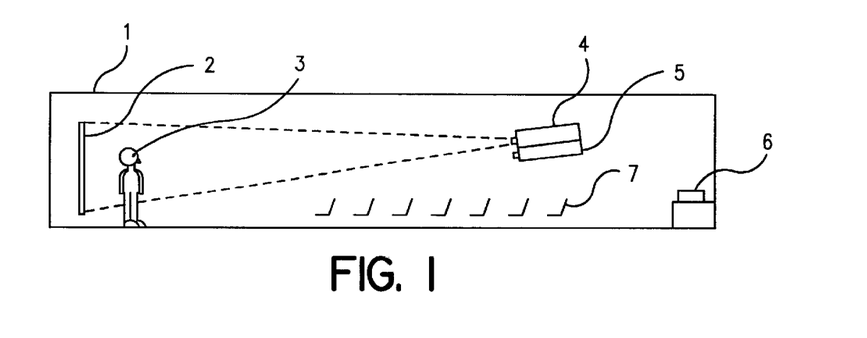
FIG. 1 illustrates the position of the signal processor unit with respect to the projector when using front projection.

FIG. 1, represents a typical conference room 1. Each room contains a screen 2, a participating presenter 3, an electronic projector 4 that is often located above an audience 7, a computer 6 or other storage device (e.g. DVD, VCR, etc.) for storing and retrieving graphics, and a signal processor 5.

The signal processor, contained in a single enclosure, is the key element of this invention in that it includes all elements of the system except the projector, projection screen, and the image storage device. This device is most likely to be a computer, and is placed in an area easily accessible to an operator.

One of the signal processor components is a camera that must be located in close proximity directly below or above the projector, assuming one is using a front projection screen, or it may be integrated into the projector. Users having ample space behind the projection screen may use rear projection. In this event, the ideal camera location is a point over the audience, normal to the screen, and on a common axis through screen center and projector lens. While liquid crystal display screens are still relatively small, they are getting bigger and may become large enough for a large audience. Another possibility is the multiple cathode ray tube display. Its disadvantages are cost and the presence of a join line between tubes. These screens have some advantages over rear projection and front projection screens with few disadvantages other than cost or small size. Although it is expected that most users will use front projection screens, the following system explanations apply to all display methods except where noted.

Figure 2:
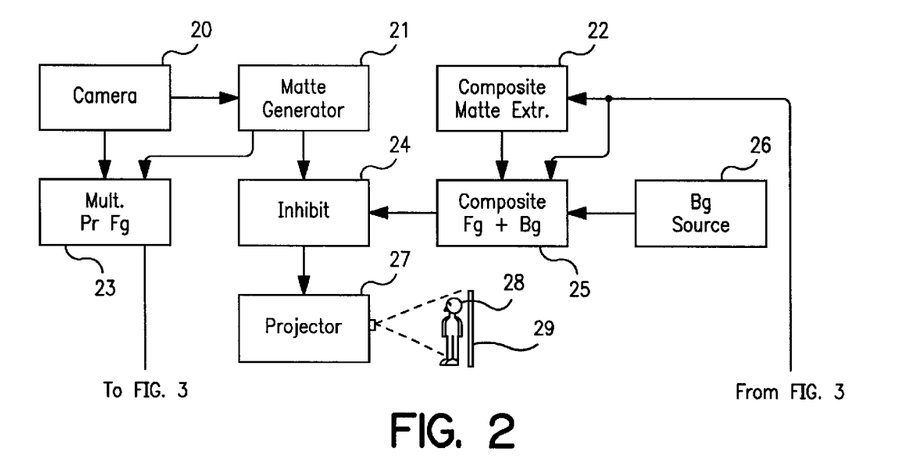
FIG. 2 illustrates the functions of the signal processor.

The camera provides an image of the presenter and anything he adds to the scene, such as material written on a white board. The participants may not always require stored background graphics, and on these occasions, memory 26 will contain a black slide, or will not be used.

Figure 3:
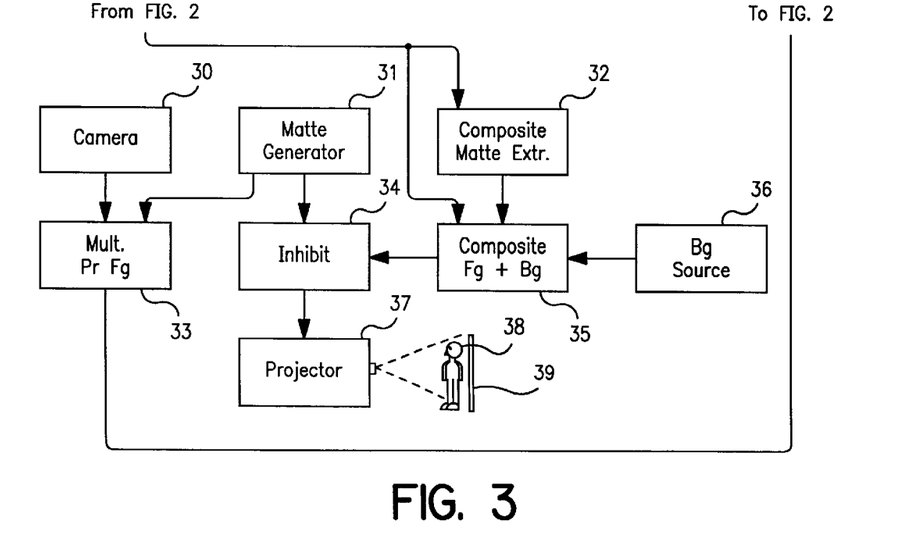
FIG. 3, together with FIG. 2, illustrates the interconnections between two locations.

FIG. 2 and FIG. 3 represent the display components at locations A and B, distant from each other, but the diagrams of FIGS. 2 and 3 illustrate the interactions occurring between the components at each location. The numbers 20 through 29 represent the functions of a signal processor. Number series 30 through 39 are the same signal processor functions at a second location.

Referring to FIG. 2 (location A), a selected graphics image from memory 26 is routed through compositing function 25, through inhibitor function 24, then to projector 27 which projects the selected graphics onto screen 29. The audience at location A will see the stored graphics image from a local memory projected onto the projection screen as an original without loss of detail.

Referring to FIG. 3 (location B), the same graphics image will be retrieved from computer 36 and routed through compositing function 35, through inhibitor function 34, then to projector 37 that projects the selected graphics onto screen 39. If there is a third and fourth participating location, their audience will also see the same graphics, obtained from their own computer, being projected onto their screens without loss of detail.

As long as there is no presenter in front of any projection screen, the presenter matte extraction function (22,32) has nothing to extract, and compositor (25,35) has no foreground image to composite, and the inhibitor (24,34) has no presenter to protect. When a person or object enters in front of the screen, it becomes a foreground subject and activates the above subject-related functions.

Camera 20 is located directly below projector 27 so as to see presenter 28 and to maintain the proper alignment of the inhibit matte. A beam splitter is provided in camera 20 to split off an infrared or other image for the generation of a matte signal in matte generator 21.

There are several matte generation methods in use. One is described in U.S. application Ser. No. 09/788,026 filed Feb. 16, 2001. One such method is described with reference to FIG. 4 as follows.

Figure 4:
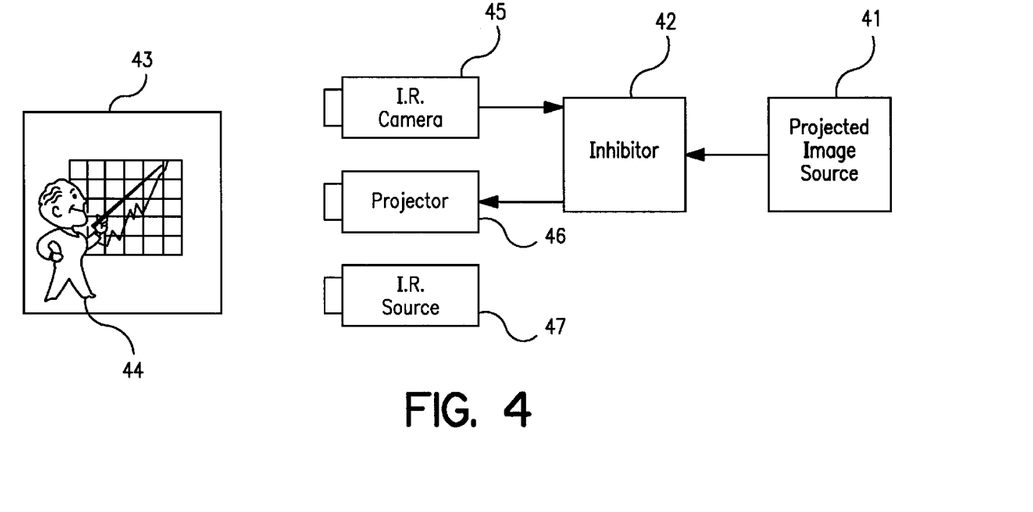
FIG. 4 shows a block diagram of the components comprising this invention.

Projected image source 41 of FIG. 4 represents the source of video image to be projected onto projection screen 43. Image source 41 may be a computer, videocassette, digital videodisc, another camera or other source of video image.

The video program signal from image source 41 is connected to inhibitor 42 where the video signal at selected pixels may be inhibited. The program signal is then connected from inhibitor 42 to video projector 46, which projects the program image on projection screen 43.

In one embodiment, at least one infrared source 47 is used to uniformly illuminate projection screen 43. Being infrared, this illumination is not seen by the viewer. Camera 45 is an infrared sensitive video camera observing the uniformly illuminated projection screen. Camera 45 output is connected to video inhibitor 42. The infrared signal at inhibitor 42 from the projection screen is nulled to zero. In the event a subject 44 enters into the projection beam, the subject's infrared reflection is likely to be higher or lower than the uniform infrared luminance level of the projection screen. Any infrared deviation from the infrared signal level established for the projection screen represents the subject. The addresses of those detected pixels that identify the subject location are used to inhibit the video program signal at these same addresses.

There is always a possibility that some small area on the subject's wardrobe will reflect exactly the same amount of infrared as the screen. In this area, the inhibitor is fooled and the video signal is not inhibited. Such areas are of little concern since there is little probability of infrared reflection from the subject's face matching that of the screen.

The probability of deceiving the inhibit logic is reduced by selecting the infrared camera's pass band least likely to match the reflection levels of the subject.

The near infrared bandwidth is very wide, and the infrared provided by an incandescent source provides a flat wide illumination bandwidth. The infrared sensitive camera may therefore be equipped with filters of adjoining pass bands such as 700–800, 800–900, and 900–1000 nanometers. It takes only a small shift in the pass band to effect a large change in infrared reflection. A filter selection may be made during setup to prevent the subject's infrared reflection from matching that of the screen.

An alternative to selecting external pass band camera filters is to incorporate two or more infrared image channels in the camera, each filtered to a different pass band, with a separate infrared reference frame stored for each pass band.

It is highly unlikely the subject's infrared reflection would simultaneously match the infrared reflection of two or more infrared pass bands.

Options

To inhibit the projected image from falling upon the subject when the subject enters into the projected image, it is necessary to separate the subject from the scene being projected upon it.

There are several existing ways of detecting a subject's location. A standard difference key, or matte, relies on a reference frame of the blank screen to compare with each succeeding frame to detect the subject's location. Since an image within the visible spectrum is also being projected onto the screen, a standard difference key does not appear to function in this application.

Another option is to flood the projection screen with one or more bands of ultra violet light outside visible wavelengths.

One might also separate the subject from the projection screen by using a long wave infrared camera sensitive to the temperature of the human body. Since a camera of this type sees body temperature, there is no need to flood the screen with long wave infrared.

Other methods identify the subject presence by radar or sonar techniques that detect a subject as being at a shorter distance than the screen.

Stereoscopic devices, and maximizing image detail, have been used in automatic cameras to determine distance. Any scheme that provides a signal separating the subject from the projected image may be used in this invention to inhibit the projected image in the area occupied by the subject.

Preferred Option

A preferred option is the use of near infrared to illuminate the projection screen. The infrared luminance level of the projection screen may be monitored and the reference frame updated to compensate for line voltage changes to the infrared source. The updated reference frame permits improved subject detection when infrared differences are very small. By using the infrared portion of the radiation spectrum, the projected and detected infrared images are immune from projected image content changes.

Using infrared illumination to generate a difference or ratio matte provides a practical method of identifying those pixels occupied by a subject. Equations for generating suitable ratio and difference mattes for this purpose are as follows:

Ratio Matte

If $IRo < IRm$ $M = IRo/IRm$

If $IRo > IRm$ $M = IRm/IRo$

If $IRm = IRo = 0$ $M = 0$

Difference Matte $M = 1 - \{\max[(IRo - IRm), (IRm - IRo)]\}$

Where:

IRo=observed IR pixel value

IRm=stored IR pixel value (at the same location)

M=calculated matte value

Figure 5:
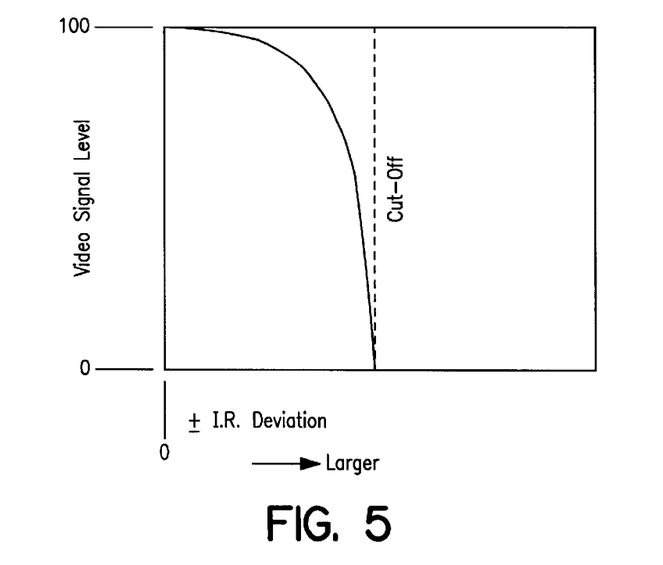
FIG. 5 is a curve showing the relationship between infrared deviation from that of the screen and the reduction of video signal.

Inhibiting of the projected image may be continuous, either linear or nonlinear, as opposed to a switch action. If nonlinear, the earliest and smallest detectable variance of the infrared signal is made to cause a small reduction of video signal level. As the deviation increases, the rate of inhibition increases. When the deviation nears a selected level, the inhibition rate is rapidly increased to cutoff, or to a selected low level near cutoff. The variable rate at which signal inhibition occurs prevents the on-off flicker effect of a switch action. FIG. 5 illustrates this relationship.

The term "inhibit" is defined as a reduction in the level of the projected image in that area occupied by the subject. In fact, if the level is reduced to about 5% of full level, the visibility of the subject is reduced to visual black. With little or no projector illumination onto the subject, it will receive no illumination other than ambient room light, which is typically attenuated to a very low level when using a projector.

Since subject illumination from the video projector has been inhibited to near zero, RGB levels representing white (or colored) light may be added to those pixels defining the subject area. The illumination of the subject may therefore be increased above that produced by ambient light alone. Although at a lower level, supplementary subject illumination augmenting ambient room light, is likely to be somewhat annoying to the subject facing the projector.

The techniques described in U.S. Pat. No. 5,270,820 may be used to locate the speaker's head (or other extremity). With this additional information, the projected white (or colored) light onto the subject may be inhibited in the region of his head and eyes.

The term "projection screen" or "screen" has been used above. This screen may be white, beaded, metallic, or metallic coated lenticular, or any surface suitable for viewing a projected image.

Implementation

In FIG. 4, image source 41, the video program source may be a computer, videotape, or videodisc as selected by the user.

The video projector 46 and projection surface 43 are commercial devices selected by the user. An infrared filter, if needed, removes any residual infrared in the video projection beam.

The infrared sensitive camera 45 is a video camera whose photoreceptors extend into the near infrared beyond 700 nanometers. A filter is placed over the camera lens to remove visible wavelengths.

At least one infrared source 47 is a projector using an incandescent lamp. A filter is placed over the infrared source to remove visible light. Inhibitor 42 is the detector/inhibitor. Its function has been described earlier.

Figure 6:
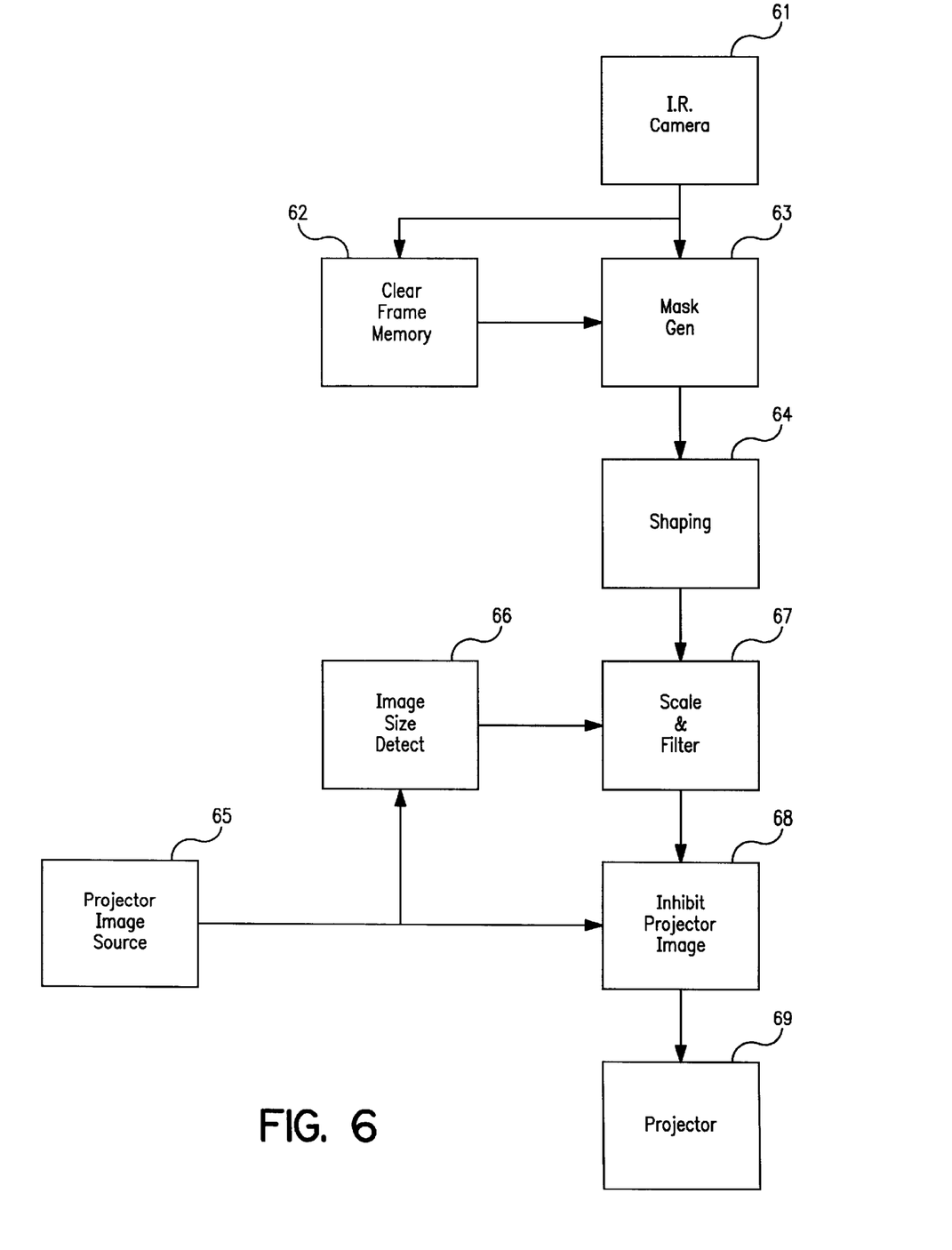
FIG. 6 is a logic diagram of the elements of an operational system.

FIG. 6 is a logic flow diagram showing the functions of subject detection and program signal inhibiting. Referring to FIG. 6, IR camera 61 may be a 480 line VGA progressive scan low resolution camera, or any other low resolution camera sensitive to near infrared. Clear frame memory 62 is a stored infrared image of the infrared illuminated screen with the subject removed from the scene. The mask generator 63 compares the infrared sensitive camera image with the clear frame image in memory 62 and any difference identifies that area occupied by a subject, if present. Shaping function 64 shapes the subject detection signal from an on-off signal to a linear, or a nonlinear signal as shown in FIG. 5.

Projector image source 65 is the program source to be projected onto the projection screen. The program video is generally an image of much higher resolution than an NTSC signal. Image size detect 66 determines the resolution of the program image and connects this size data to scale and filter 67, which acts as a standards converter, to scale the size of the infrared camera to match the size of the projected image. Having matched image sizes, the program image is inhibited in inhibit projector image 68 in the area occupied by a subject, if a subject is present. Projector 99 projects program image onto the screen, but does not project the program onto the subject.

Matte signal 21 is generated by one of such existing methods from information provided by camera 20.

Matte signal generator 21 generates an inhibit matte signal and supplies it to inhibitor 24. The matte signal is assigned a 0.0 value for those pixels that constitute the foreground subject. Pixels in areas of the screen displaying the graphics surrounding the subject are assigned a 1.0. The graphics image 26, passes through compositor 25 to the inhibit multiplier 24. The graphics image is multiplied in 24 by the matte signal from 21 whose zeros in the subject area shut off (inhibit) the projector signal in the area of the subject. At this point the audience at location A (FIG. 2) sees the presenter, illuminated by room light, with the graphics appearing on the screen behind him. The presenter may look at his audience without being blinded by the glare of the projector. The use of a matte signal in generating an inhibit signal is described above. (While the matte signal will be required to isolate the subject, an inhibit signal is not required for a rear projected image or a liquid crystal display.)

The inhibit matte signal from generator 21 is inverted to form a second matte signal providing a 1.0 value for the subject area and a 0.0 value for the background surrounding the subject. This second matte and the video signal from camera 20 are connected to multiplier 23. Their product is the Processed Foreground signal (PrFg) consisting of the subject against a 0.0 field of black. The processed foreground having a subject on a field of 0.0 black is intentional since the blackest black in a video signal sits atop a pedestal of about 7% of white. The 0.0 of the processed foreground video is therefore a matte signal transmitted with the isolated subject. The processed foreground 23 from location A is connected to the matte extraction function 32 and compositing function 35 at location B.

The matte extraction function 32 separates the processed foreground, whose lowest level is the 7% pedestal, from the 0.0 of the black field by setting a detection threshold at about 3%. All pixels above the threshold are in the foreground and are assigned a 1.0 value. All pixels below the selected threshold are in the background and are assigned a 0.0 value. The assignment of pixel values as 1.0 or 0.0 is arbitrary and may be inverted as required by the function it is intended to control. A threshold level above camera and system noise is necessary to prevent background area noise peaks from incorrectly being accepted as a subject pixel.

The extracted matte is inverted to provide a 0.0 in the processed foreground area and a 1.0 in the graphics area surrounding the subject. Multiplying the graphics image from source 36 by 1.0 (the matte signal) retains the full signal level of the graphics surrounding the subject, but the 0.0 in the subject area creates a 0.0 black hole in the projected graphics. Compositing function 35 adds the processed foreground, consisting only of the subject, into the hole created for it. The composite image from 35 is routed through the inhibit function 34 to projector 39. The audience at location B sees the graphics from their own image source 36 being projected onto their own screen with the video image of the presenter from location A composited over their graphics.

The quality of the image is limited only by the resolution of the original image, and the resolution of the projector. By pre-loading the graphics at each location, the remaining data to send to other locations is only the processed video signal, with sound.

The process of using the matte signal to multiply and add to composite an image over a background preserves subject edge transparency. However when the matte signal assigned, is a binary switch (i.e. 1.0 or 0.0), and therefore the composite image may be formed by a key function derived from the matte signal to switch between a stored image and the presenter. In either case the presenter pixel values replace those of the background image to form the composite image.

A binary I/O matte signal generates a sharp edged switch, however the matte edge can be sized to better fit the subject outline, and it may be softened to improve the transition from the presenter to his background.

The inhibit function 34 awaits the presence of a presenter 38. When a person 38 at location B, wishes to participate, he steps in front of his screen. Functions 30, 31 and 34 inhibit pixels in projector 37 from projecting onto the person 38. Functions 30, 31, and 33 generate a processed foreground, PrFg, which is routed back to location A to the matte extractor 22 and compositor 25. The video of person 38 at location B, in front of his screen, will be composited over the graphics being projected at location A. The audience at location B will see participant 38 in person in front of the projected graphics, and presenter 28 will be seen composited over said graphics.

By looking at the screen, both participants will see the other person's video image composited with the graphics. The participants may see and face each other, point to elements in the graphics, and discuss them. The audience at locations C and D will see the presenter A and participant B on their projection screens. A person at C and D may also become a participant by stepping in front of their screen. The audience at the location of a participant will see their presenter in person and all other presenters will appear on the screen behind him, but in front of projected graphics.

There is an obvious limitation to the number of simultaneous participants that can be in the scene and still see the graphics behind them. If the presentation is in the form of a number of speeches, the graphics may be generated to occupy the upper part of the screen so the seated participants will not obscure material that needs to be seen by the audience. Each presenter in turn makes his presentation while the audience at all locations watch the speaker and the reaction of those seated.

If a large white board is used as a projection screen, then the presenter and whatever he writes or draws becomes part of the subject matter and will be projected onto the white boards at the other locations. A participant from another location may draw on his own white board and his writing will be projected on all the other white boards. In this manner each location may contribute to a drawing, add to a list, mark locations on a map, etc.

Figure 7:
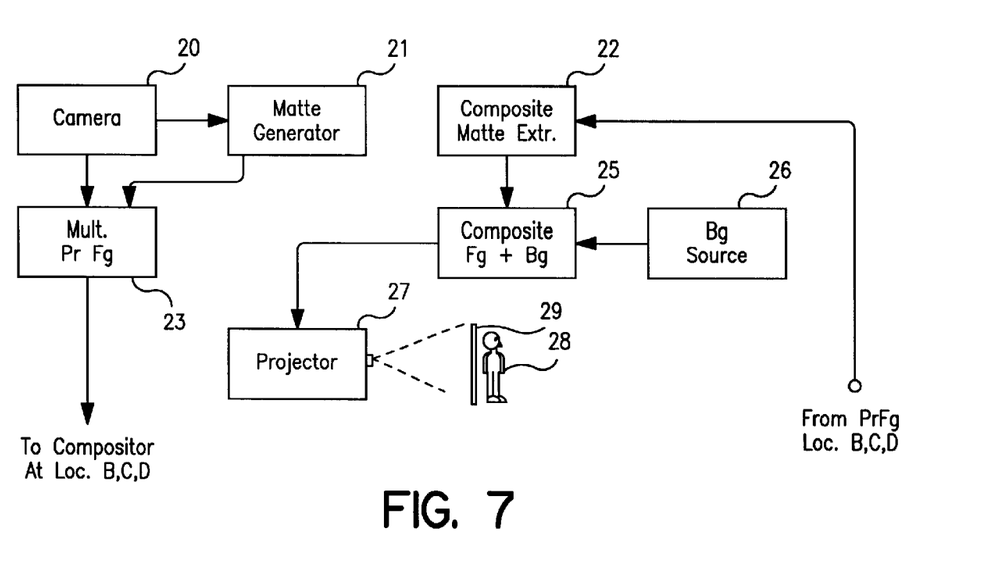
FIG. 7 illustrates the functions of the signal processor when using rear projection or liquid crystal display screens.

Rear projection and liquid crystal display systems do not require the inhibit function 24, and is therefore bypassed. FIG. 7 shows the signal flow through a signal processor after the inhibit function is removed or inactivated.

INTERCONNECTING MULTIPLE LOCATIONS

Figure 8:
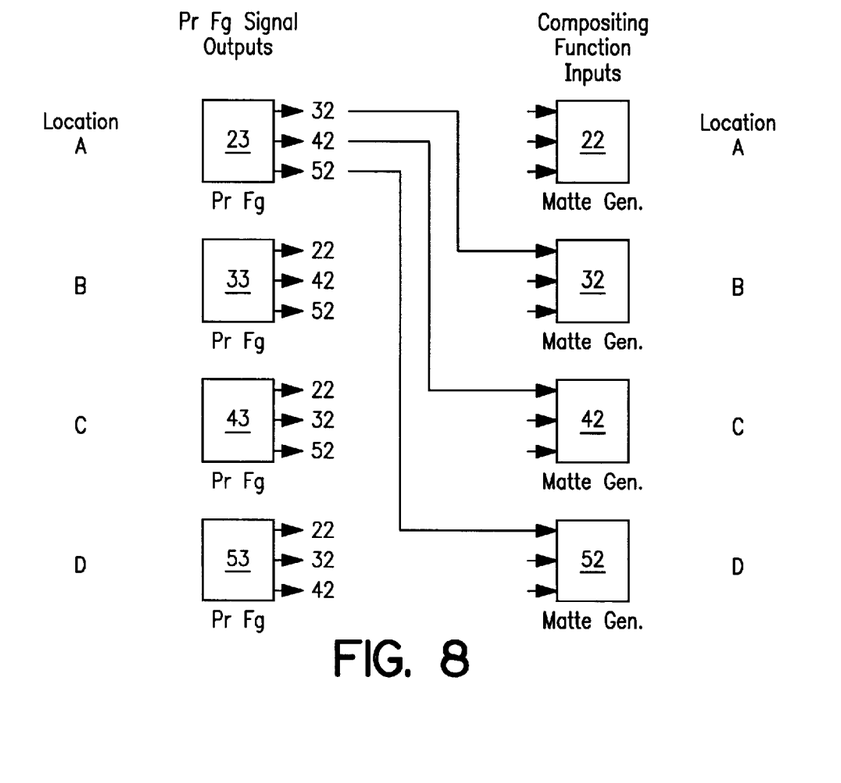
FIG. 8 illustrates the interconnections required for four-location teleconferencing.

FIG. 8 illustrates the interconnections required for four participating locations such as A, B, C and D. The output signal at each of these locations is a Processed Foreground (PrFg) and is connected to the compositing function at all other locations. The input needed by each location is the PrFg signal from all other locations. In FIG. 8, the PrFg 23 from location A is shown connected to composite functions B, C, and D to illustrate how the PrFg is connected to the input stages at other locations. The remaining connections are made as indicated in FIG. 8.

Figure 9:
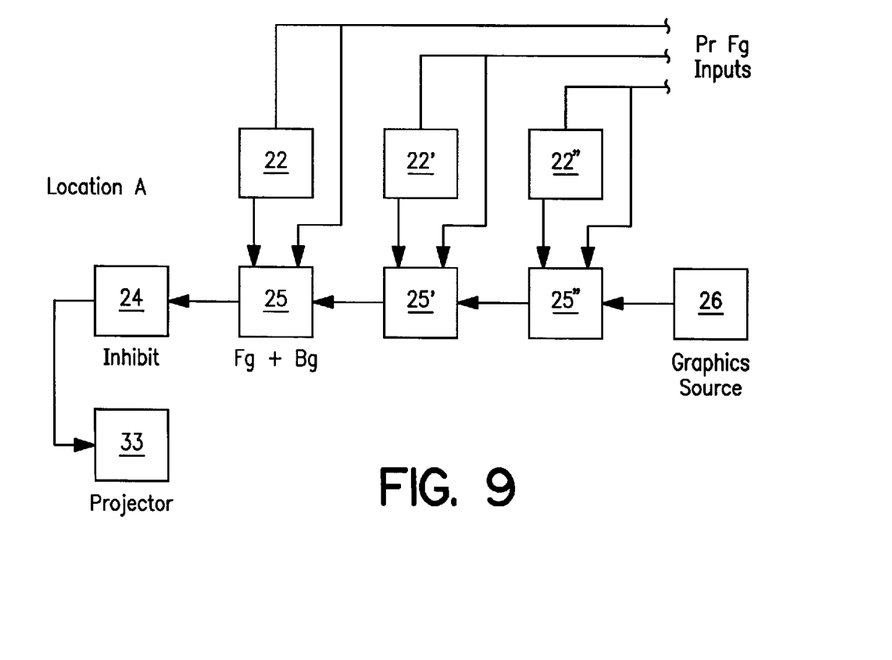
FIG. 9 illustrates the additional compositing stages required when adding a third and forth location.

FIG. 9 illustrates the compositing function needed when there are four participating locations. Functions 22 and 25 are all that are needed if only location B is sending a PrFg signal to location A. The addition of a third location, C, requires a separate compositing stage 22' and 25'. The addition of a fourth location, D, requires a separate compositing stage 22" and 25". The number of compositing stages needed is one less than the number of participating locations.

What is claimed is:

1. A method for displaying a composite video image of a presenter in front of a selected background image, at multiple remote locations, without loss of detail in the background image or in the presenter's image, comprising the steps of,
    a) storing in a memory at each remote location said selected background image,
    b) generating a matte signal that identifies those pixels in the video image representing said presenter,
    c) transmitting to each remote location the signal levels of pixels including said presenter,
    d) generating a composite video image of said presenter and said stored selected background image by replacing pixel levels in the background image, at corresponding addresses, with pixel levels of said presenter's image.

2. The method of claim 1 wherein said image storage memory, for storing and retrieving an image, includes a computer, DVD, VCR, or other image storage and retrieval device.

3. The method of claim 1 wherein said stored selected background image includes at least one of graphics, charts, tables and photographs.

4. The method of claim 1 wherein the selected background image is downloaded to remote locations at the time of its selection.

5. The method of claim 1 wherein the video image of a presenter, transmitted to remote locations, includes said presenter on a field of black at a signal level of 0.0.

6. The method of claim 5 wherein those pixels whose signal level exceeds a set threshold above zero, identify the presenter's video signal.

7. The method of claim 1 wherein the selected background image is stored at remote locations in advance of a teleconference.

8. The method of claim 1 wherein said composite video image may be viewed on at least one of a front projection screen, a rear projection screen, a self luminous liquid crystal display and a cathode ray tube display.

9. The method of claim 8 in which said composite video image viewed on said front projection screen, employs an electronic projector.

10. The method of claim 9 in which said electronic projector is inhibited in said presenter area to prevent said presenter from being illuminated by said projected image.

11. The method of claim 1 in which a person in at least one remote location may become a participant and be seen on the projection screen at all other locations, by stepping in front of the participant's own projection screen.

12. The method of claim 11 in which persons in at least two locations may become participants at the same time and may be seen on the projection screen at all other locations, by each participant stepping in front of the projection screen at each participant's own location.

13. A signal processing apparatus for displaying a composite video image of a presenter in front of a selected background, at multiple locations without loss of detail in the background image or in the presenters image, comprising:
  a) means for storing said selected background image in a memory (26) at each remote location,
  b) means for generating a matte signal (21) that identifies those pixels in the video image that include the presenter's video signal,
  c) means for transmitting to each remote location the signal levels (23) of pixels comprising said presenter,
  d) means for compositing (22,25) said presenter over said background, at each remote location, and
  e) means for displaying (27,29) said composite image.

14. The apparatus of claim 13 wherein said means for storing a selected background image includes one of a computer, DVD, VCR, or other image storage device.

15. The apparatus of claim 13 wherein said means for compositing said presenter over said background comprises compositing hardware or software under control of said matte signal.

16. The apparatus of claim 13 wherein said display means includes at least one of a commercial electronic projector and a projection screen, a CRT display, and a liquid crystal display.

17. The apparatus of claim 16 wherein said projection screen is capable of reflecting infrared illumination.

18. The apparatus of claim 13 wherein said apparatus is capable of performing identical functions at all locations.

* * * * *